(12) United States Patent
Goto

(10) Patent No.: US 8,666,644 B2
(45) Date of Patent: Mar. 4, 2014

(54) DRIVE ASSISTANCE APPARATUS

(75) Inventor: Hiroki Goto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 135 days.

(21) Appl. No.: 13/129,971

(22) PCT Filed: Dec. 25, 2008

(86) PCT No.: PCT/JP2008/073571
§ 371 (c)(1),
(2), (4) Date: May 18, 2011

(87) PCT Pub. No.: WO2010/073333
PCT Pub. Date: Jul. 1, 2010

(65) Prior Publication Data
US 2011/0245993 A1   Oct. 6, 2011

(51) Int. Cl.
G08G 7/02        (2006.01)
G05D 1/00        (2006.01)
G06F 19/00       (2011.01)

(52) U.S. Cl.
USPC ............................ 701/117; 701/1; 701/33

(58) Field of Classification Search
USPC ................................. 701/1, 33, 117
See application file for complete search history.

(56) References Cited

U.S. PATENT DOCUMENTS

| | | | | |
|---|---|---|---|---|
| 4,234,051 A | * | 11/1980 | Morris, Jr. | 180/272 |
| 5,786,765 A | * | 7/1998 | Kumakura et al. | 340/576 |
| 6,130,617 A | * | 10/2000 | Yeo | 340/575 |
| 6,496,117 B2 | * | 12/2002 | Gutta et al. | 340/576 |
| 2003/0078718 A1 | | 4/2003 | Takenaga et al. | |
| 2005/0030184 A1 | * | 2/2005 | Victor | 340/576 |
| 2005/0128063 A1 | | 6/2005 | Isaji et al. | |
| 2006/0184312 A1 | | 8/2006 | Kiim | |
| 2007/0168128 A1 | | 7/2007 | Tokoro et al. | |
| 2008/0243378 A1 | | 10/2008 | Zavoli | |
| 2008/0266072 A1 | * | 10/2008 | Suzuki | 340/438 |
| 2008/0270018 A1 | * | 10/2008 | Citelli | 701/200 |
| 2010/0070128 A1 | * | 3/2010 | Johnson | 701/33 |

FOREIGN PATENT DOCUMENTS

| | | |
|---|---|---|
| JP | A-03-271999 | 12/1991 |
| JP | A-07-257301 | 10/1995 |
| JP | A-2003-141698 | 5/2003 |

(Continued)

OTHER PUBLICATIONS

Extended Search Report issued in European Patent Application No. 08879129.8 dated Jun. 25, 2012.

(Continued)

*Primary Examiner* — Fadey Jabr
*Assistant Examiner* — Martin Weeks
(74) *Attorney, Agent, or Firm* — Oliff PLC

(57) ABSTRACT

Disclosed is a drive assistance apparatus capable of assisting safer driving of a vehicle. The drive assistance apparatus that includes a position detection unit detecting a positional relationship between a preceding vehicle present in front of a subject vehicle and the subject vehicle and executes a drive assistance control assisting the driving of the subject vehicle according to the detected results, wherein the drive assistance apparatus includes an acquisition unit that acquires signal device information regarding a signal device on a traveling path of the subject vehicle and a setting unit that sets execution conditions for executing the drive assistance control based on the signal device information acquired by the acquisition unit.

7 Claims, 5 Drawing Sheets

(56) References Cited

FOREIGN PATENT DOCUMENTS

| | | |
|---|---|---|
| JP | A-2004-110416 | 4/2004 |
| JP | A-2004-234684 | 8/2004 |
| JP | A-2005-239114 | 9/2005 |
| JP | A-2007-226666 | 9/2007 |
| JP | A-2008-003707 | 1/2008 |
| JP | A-2008-204185 | 9/2008 |

OTHER PUBLICATIONS

English-language translation of International Preliminary Report on Patentability issued in International Application No. PCT/JP2008/073571 dated Aug. 9, 2011.

International Search Report issued in International Application No. PCT/JP2008/073571 dated Jan. 27, 2009.

* cited by examiner

DRIVE ASSISTANCE APPARATUS

TECHNICAL FIELD

The present invention relates to a drive assistance apparatus that includes position detection means detecting a positional relationship between obstacles present in front of a subject vehicle and the subject vehicle and executes a drive assistance control assisting the driving of the subject vehicle according to the detected results.

BACKGROUND ART

In the related art, in order to assist safe driving of a vehicle, a vehicle-mounted device is known that issues warnings when a driver is not attentive. For example, Patent Literature 1 disclosed a technique that sets warning levels based on at least one of the geographical circumstances around the subject vehicle position, vehicle circumstances around the subject vehicle, and driving circumstances of the subject vehicle and warns of driver inattentiveness based on the set warning levels when driver inattentiveness is detected.

CITATION LIST

Patent Literature Japanese Unexamined Patent Application Publication No. 2007-226666

SUMMARY OF INVENTION

Technical Problem

The speed of other vehicles can be easily changed due to the influence of signal devices around an intersection where the signal devices are installed. However, the technology disclosed in Patent Literature 1 that sets the warning levels based on at least one of the geographical circumstances around the subject vehicle position, the vehicle circumstances around the subject vehicle, and the driving circumstances of the subject vehicle does not take into account the influence of the signal devices. Therefore, a need exists for a technology capable of assisting safer driving.

Therefore, an object of the present invention is to provide a drive assistance apparatus capable of assisting safer driving of a vehicle.

Solution to Problem

According to an exemplary embodiment of the present invention, there is provided a drive assistance apparatus that includes position detection means detecting a positional relationship between obstacles present in front of a subject vehicle and the subject vehicle and executes a drive assistance control assisting the driving of the subject vehicle according to the detected results, the drive assistance apparatus including: acquisition means that acquires signal device information regarding signal devices on a traveling path of the subject vehicle and setting means that sets execution conditions for executing the drive assistance control based on the signal device information acquired by the acquisition means.

According to the exemplary embodiment of the present invention, the execution conditions for executing the drive assistance control that assists the driving of the subject vehicle are set by the setting means, based on the signal device information acquired by the acquisition means. Since the execution conditions are set based on the signal device information, even though the speed of other vehicles may be changed due to the influence of the signal devices around an intersection where the signal devices are installed, it is possible to cope with the change by appropriately executing the drive assistance control. As a result, it is possible to assist the safer driving of the vehicle.

Further, the signal device information includes switching information regarding a switching of a signal type in the signal devices and the setting means may change and set the execution conditions based on the switching information included in the signal device information.

In this manner, the setting means changes and sets the execution conditions based on the switching information included in the signal device information. For this reason, it is possible to cope with the change to a yellow signal and the change to a red signal in regard to the signal device by appropriately executing the necessary drive assistance control. As a result, it is possible to assist the safer driving of the vehicle.

Further, the drive assistance apparatus further includes inattentiveness detection means that detects the inattentiveness of the driver driving the subject vehicle, wherein the setting means may change and set the execution conditions when the inattentiveness detection means detects the inattentiveness of the driver.

In this manner, the setting means changes and sets the execution conditions when the inattentiveness of the driver is detected. For this reason, it is possible to cope with the inattentiveness of the driver by appropriately executing the necessary drive assistance control. As a result, it is possible to assist the safer driving of the vehicle.

Further, the setting means may change and set the execution conditions by changing threshold values corresponding to the setting of the execution conditions.

In this manner, threshold values corresponding to the setting of the execution conditions are changed based on the signal device information acquired by the acquisition means. For this reason, it is possible to cope with the change by more appropriately executing the necessary drive assistance control by slightly changing the threshold values. As a result, it is possible to assist the safer driving of the vehicle.

Advantageous Effects of Invention

As set forth above, the exemplary embodiments of the present invention can provide the drive assistance apparatus capable of assisting the safer driving of the vehicle.

REFERENCE SIGNS LIST

Figure 1:
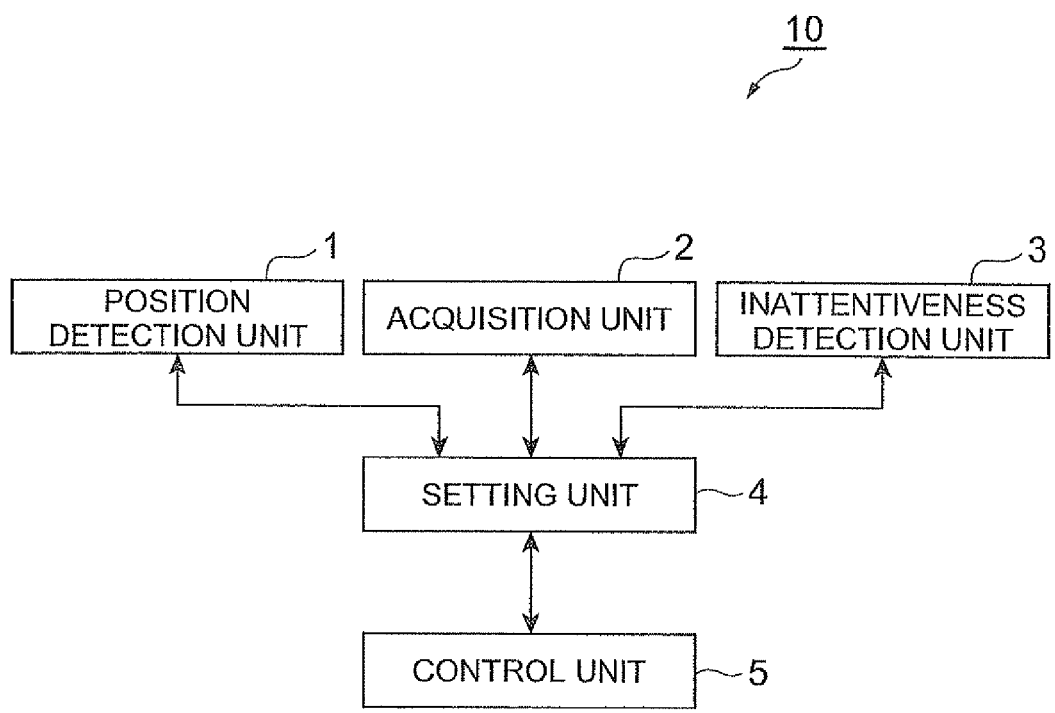
FIG. 1 is a diagram schematically showing a configuration of a drive assistance apparatus according to an exemplary embodiment of the present invention.

1: POSITION DETECTION UNIT, 2: ACQUISITION UNIT, 3: INATTENTIVENESS DETECTION UNIT, 4: SETTING UNIT, 5: CONTROL UNIT, 10: DRIVE ASSISTANCE APPARATUS, A: SYSTEM OPERATION RANGE, C: SUBJECT VEHICLE, I: INFRASTRUCTURE COMMUNICATION DEVICE, P: PRECEDING VEHICLE, S: SIGNAL DEVICE

DESCRIPTION OF EMBODIMENTS

Hereinafter, exemplary embodiments of the present invention will be described with reference to the accompanying drawings. In order to facilitate understanding of the explanation, like components are denoted by like reference numerals, if possible, and overlapping description will be omitted.

First, a configuration of a drive assistance apparatus according to an exemplary embodiment of the present invention will be described with reference to FIG. 1. FIG. 1 is a diagram schematically showing a configuration of a drive assistance apparatus 10 according to an exemplary embodiment of the present invention. The drive assistance apparatus 10 is an apparatus that is mounted in a vehicle (hereinafter, referred to as a subject vehicle) such as a car, or the like, to detect a positional relationship between obstacles present in front of a subject vehicle and the subject vehicle itself and executes a drive assistance control assisting a driver to more safely drive the subject vehicle according to the detected results. For example, when the subject vehicle has a positional relationship in which contact with other vehicles is likely within a certain time, the drive assistance control performs the issuing of a warning calling for the attention of the driver, the execution of a traveling control to avoid contacting other vehicles, or the like.

The drive assistance apparatus 10 according to the exemplary embodiment of the present invention includes a position detection unit 1 (position detection means), an acquisition unit 2 (acquisition means), an inattentiveness detection unit 3 (inattentiveness detection means), a setting unit 4 (setting means), and a control unit 5 (control means). Further, the functions of the setting unit 4 and the control unit 5 are implemented by, for example, an electronic control unit (ECU) (not shown) that is mounted in the subject vehicle.

The position detection unit 1 is an obstacle sensor that detects obstacles (hereinafter, for example, referred to as other vehicles) present in front in the traveling direction of the subject vehicle as a detection target and detects the positional relationship between the detection target (that is, other vehicles) and the subject vehicle by calculating the positional relationship. The position detection unit 1 calculates the distance and the direction to other vehicles, relative velocity, and relative acceleration using a millimeter-wave radar or an image sensor to detect the positional relationship between other vehicles and the subject vehicle.

The acquisition unit 2 is a communication device that acquires signal device information (for example, the distance to the signal device, the signal type at the present time, or the like) in regard to signal devices around the traveling path of the subject vehicle. The signal device information includes, for example, switching information (for example, an elapsed time after the signal type at the present time is set or an estimated time to the switching to the next signal type, or the like.) regarding switching of the signal type in the signal device, that is, a green signal, a yellow signal, and a red signal. The signal device information acquired by the acquisition unit 2 includes infrastructure information regarding the infrastructure around the driving assistance device 10 or navigation information regarding a navigation system indicating the traveling path of the subject vehicle. The acquisition unit 2 transmits and receives the infrastructure information or the navigation information including the signal device information between other autonomous mobile devices and vehicles around the driving assistance device 10 or between signal devices installed at an intersection and infrastructure such as cameras, radars, communication devices, beacons, or the like, that are installed on a road.

The inattentiveness detection unit 3 is a monitoring camera that monitors a state of a driver (for example, the driver's eyes, face direction angle, eye-opening extent) driving the subject vehicle to detect an oversight of the signal device due to the inattentiveness of the driver. The inattentiveness detection unit 3 is installed around a driver's seat that is referred to as an instrument panel and faces the driver sitting behind the wheel. The inattentiveness detection unit 3 detects whether the driver is inattentive by imaging and analyzing the face of the driver.

The setting unit 4 is an arithmetic control unit that changes and sets the execution conditions (that is, operation conditions) for executing the drive assistance control based on the signal device information acquired by the acquisition unit 2. The drive assistance control is a control executed by the control unit 5 in order to assist the driving of the subject vehicle according to the detected results of the positional relationship by the position detection unit 1. Further, the setting unit 4 can change and set the execution conditions based on the switching information included in the signal device information. In addition, the setting unit 4 can change and set the execution conditions when the inattentiveness detection unit 3 detects the inattentiveness of the driver. Further, the setting unit 4 can change and set the execution conditions by changing threshold values corresponding to the setting of the execution conditions. For example, when the conditions for executing the control in the case of exceeding a predetermined threshold value are set, the threshold value can be set to be lower in order to make it easy to execute the control or the threshold value can be set to be higher in order to make it difficult to execute the control.

The control unit 5 is an execution control unit that performs the drive assistance control assisting the driving of the subject vehicle according to the detected results of the positional relationship by the position detection unit 1. The drive assistance control is a control that protects a driver or other passengers by issuing warnings calling for the attention of a driver, executing a traveling control to avoid contact with other vehicles, or the like, for example, when the subject vehicle has a positional relationship that is likely to contact other vehicles within a predetermined time.

Figure 2:
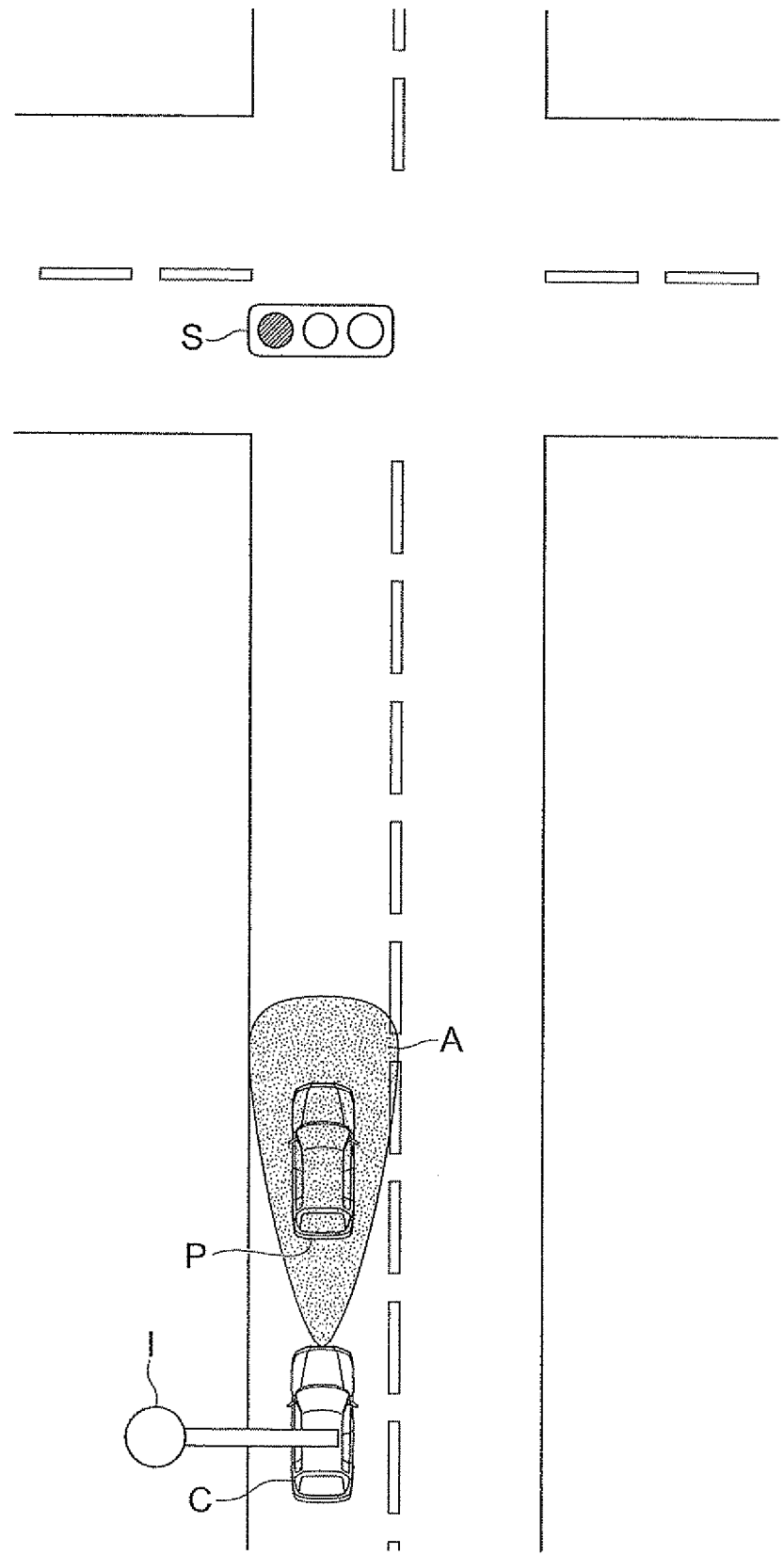
FIG. 2 is a diagram explaining a drive assistance control which is performed while a traveling vehicle is decelerated until it stops.
Figure 3:
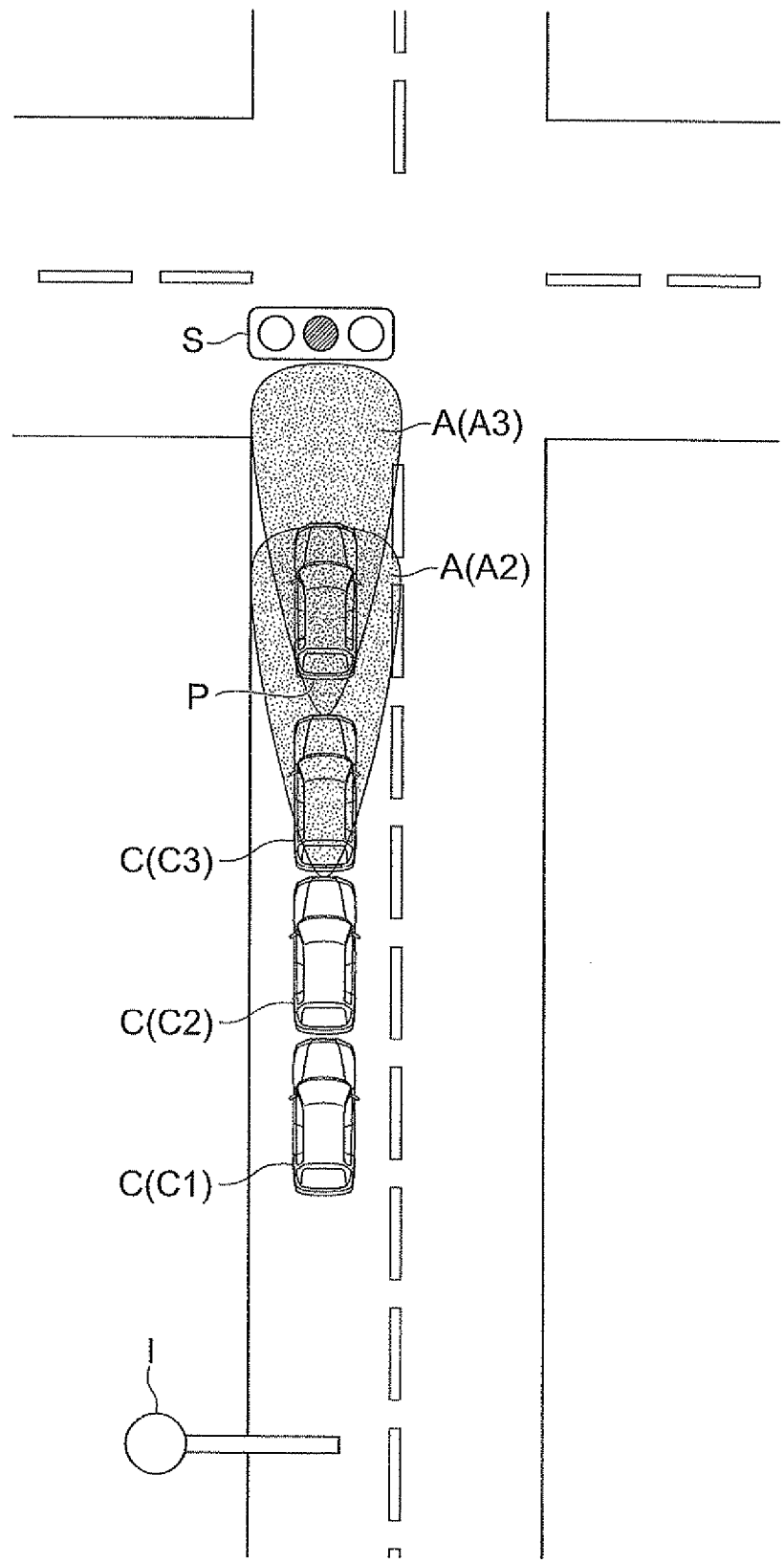
FIG. 3 is a diagram explaining the drive assistance control which is performed while a traveling vehicle is decelerated until it stops.
Figure 4:
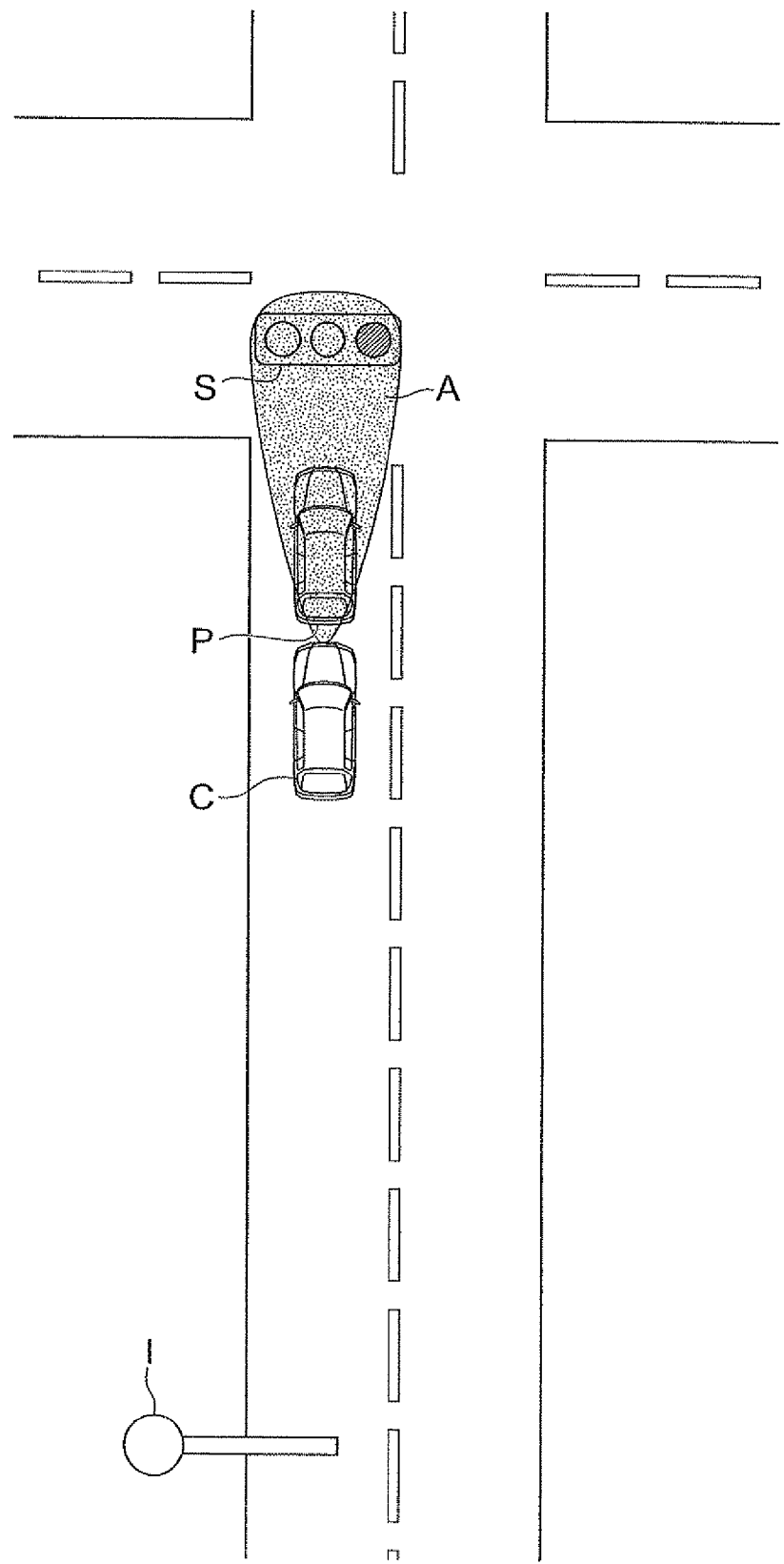
FIG. 4 is a diagram explaining the drive assistance control which is performed while a traveling vehicle is decelerated until it stops.

Next, the drive assistance control executed by the drive assistance apparatus 10 while the traveling subject vehicle is decelerated until it stops will be described with reference to FIGS. 2 to 4. FIGS. 2 to 4 are diagrams for explaining the drive assistance control that is performed by the drive assistance apparatus 10 while the traveling subject vehicle (corresponding to FIG. 2) is decelerated (corresponding to FIG. 3) until it stops (corresponding to FIG. 4).

First, as shown in FIG. 2, the acquisition unit 2 of a subject vehicle C traveling along a road in which the drive assistance apparatus 10 is mounted performs communication between an infrastructure communication device I and a road vehicle when passing through the vicinity of the infrastructure communication device I that is installed at the side of the road and receives the signal device information. In this manner, the subject vehicle C acquires the information regarding a distance to a signal device S, a signal type at the present time (herein, referred to as a green signal), or an elapsed time after the signal type at the present time is set, or the like. Further, a detection range where the obstacles can be detected by the position detection unit 1 of the subject vehicle C is shown as a system operation range A. A preceding vehicle P that is traveling ahead of the traveling direction of the subject vehicle C is included within the system operation range A and an operation of a drive assistance control system in the drive assistance apparatus 10 starts in the state where the preceding vehicle P is included within the system operation range A.

Next, as shown in FIG. 3, it is assumed that the subject vehicle C detecting the preceding vehicle P within the system operation range A is moving in the order of points C1, C2, and C3. In more detail, a system operation range A2 is a range in the case where the subject vehicle C is moving to a position of point C2 and a system operation range A3 is a range in the case where the subject vehicle C is moving to a position of point C3. During the movement of the subject vehicle C, the inattentiveness detection unit 3 of the subject vehicle C detects that the driver is not attentive. Further, during the inattentiveness, the acquisition unit 2 acquires the switching information indicating that the signal type at the present time is switched from a green signal to a yellow signal and the preceding vehicle P starts to decelerate. Herein, the setting unit 4 of the subject vehicle C changes and sets the ECU so that the drive assistance control is easily executed by relaxing the execution conditions for executing the drive assistance control based on the signal device information including the switching information (that is, the distance to the signal device S, the fact that the signal type at the present time is the yellow signal, or the like.) acquired by the acquisition unit 2.

Next, as shown in FIG. 4, the control unit 5 in the subject vehicle C where the drive assistance control is easily executed by relaxing the execution conditions executes the drive assistance control that is easily executed. In detail, the control unit 5 prevents contact with the preceding vehicle P by issuing warnings calling for the attention of a driver so as not to come into contact with the preceding vehicle P, executing a traveling control to avoid a contact with the preceding vehicle P, or the like. As a result, the driver stops the inattentiveness due to the warnings and carefully drives the subject vehicle C. For this reason, the signal type at the present time is switched from the yellow signal to the red signal and even though the preceding vehicle P stops, it is possible to prevent contact between the subject vehicle C and the preceding vehicle P.

Figure 5:
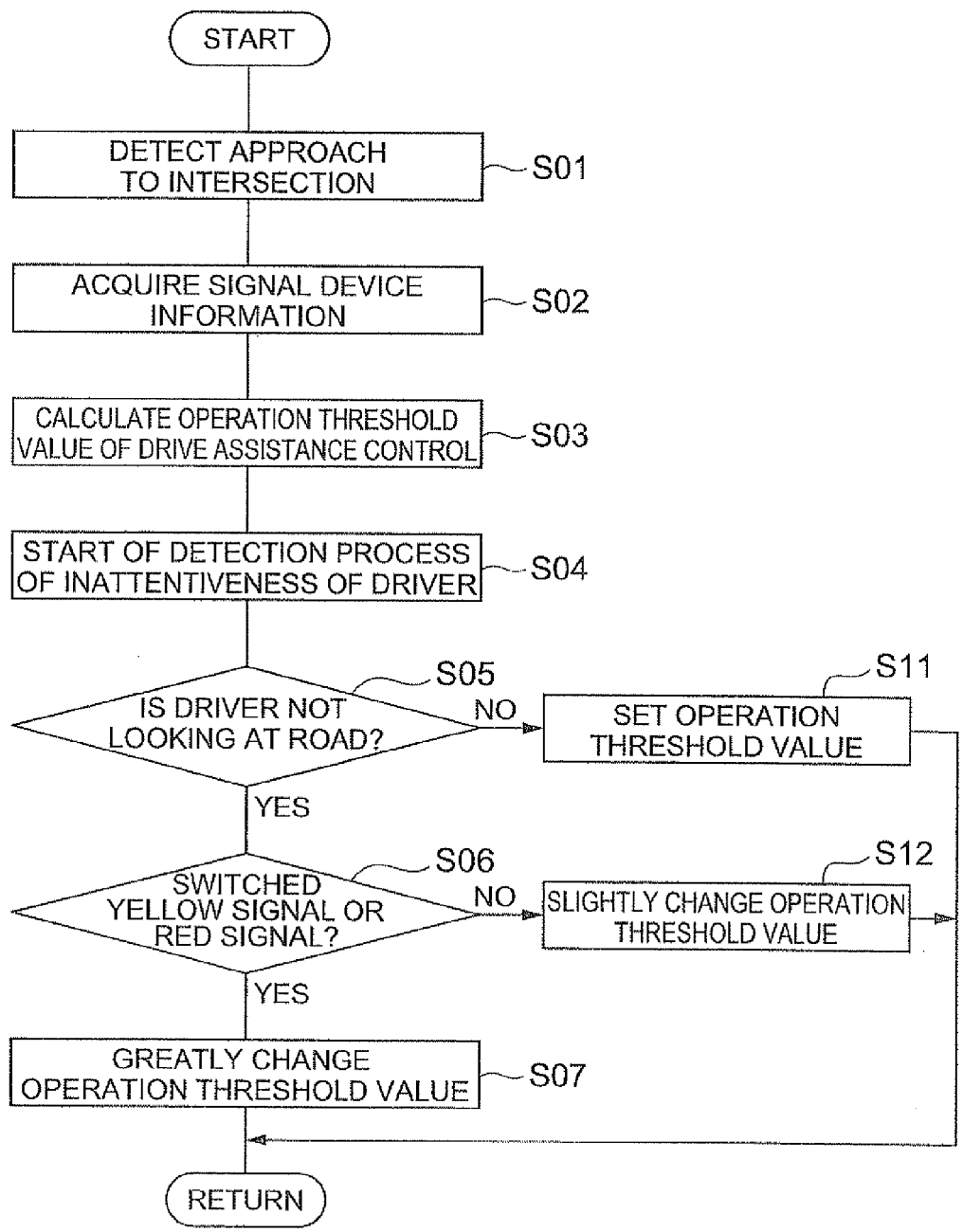
FIG. 5 is a flow chart explaining a process sequence of the drive assistance control executed by the drive assistance apparatus.

Next, a process sequence of the drive assistance control executed by the drive assistance apparatus 10 will be described with reference to FIG. 5. FIG. 5 is a flow chart explaining the process sequence of the drive assistance control executed by the drive assistance apparatus 10. The process shown in the flow chart of FIG. 5 is mainly executed by the ECU and is repeatedly performed in a predetermined time interval while a power supply of the drive assistance apparatus 10 is turned on to start the process and is then turned off.

First, if the positional relationship where the preceding vehicle P traveling ahead of the traveling direction of the subject vehicle C is included in the system operation range A in the position detection unit 1 of the subject vehicle C is detected, the operation of the drive assistance control system in the drive assistance apparatus 10 starts. Further, the acquisition unit 2 detects that the subject vehicle C approaches the intersection by acquiring the infrastructure information, the navigation information, or the like, from, for example, the surrounding infrastructure (step S01).

Next, the acquisition unit 2 acquires the distance to the signal device, the signal type at the present time, the elapsed time after the signal type at the present time is set, or the like, by executing road-to-vehicle communication that receives the signal device information regarding the signal devices at the intersection around the traveling path of the subject vehicle C from, for example, the signal devices (step S02).

Next, the setting unit 4 calculates the execution conditions for executing the drive assistance control based on the signal device information that is acquired at step S02. In calculating the execution conditions, the setting unit 4 calculates operation threshold values corresponding to the setting of the execution conditions and temporarily stores them (step S03). The operation threshold value is a threshold value that becomes a reference used for determining whether to execute the drive assistance control and is a numerical value based on the driver state and the road shape around the subject vehicle C. For example, when the conditions for executing the control in the case of exceeding the operation threshold value are set in the setting unit 4, the threshold value can be set to be lower in order to make it easy to execute the control or the threshold value can be set to be higher in order to make it difficult to execute the control.

Next, the inattentiveness detection unit 3 starts the detection process that detects the inattentiveness of the driver driving the subject vehicle C (step S04).

Next, the inattentiveness detection unit 3 determines whether the driver is not looking at the road (step S05). When the driver is looking at the road, the operation threshold value temporarily stored at step S03 is changed and set based on the signal type at the present time when the signal device information acquired at step S02 is indicated (step S11). In more detail, if it is determined that the signal type becomes the red signal after a predetermined specified time, the operation threshold value temporarily stored is greatly changed (that is, a change of a predetermined value or more) and set so that the drive assistance control is very easily executed by greatly relaxing the execution conditions.

Meanwhile, if it is determined that the signal type becomes the yellow signal or the green signal after the predetermined specified time, the operation threshold value temporarily stored is slightly changed (that is, a change below a predetermined value) and set so that the drive assistance control is slightly more easily executed by slightly relaxing the execution conditions (that is, in order to be able to issue the warnings only for the inattentive driving). In this manner, the useless operation of the drive assistance control is suppressed. Further, when the operation threshold value is exceeded, the control unit 5 executes the drive assistance control to end the series of processes. Meanwhile, when the driver is not looking at the road, the process proceeds to the following step S06.

In step S06, the setting unit 4 determines whether the signal type at the present time when the signal device information acquired at step S02 is indicated is the switched yellow signal or the switched red signal. When the signal type at the present time is not the switched yellow signal or the switched red signal, that is, when the signal type at the present time is the green signal, the operation threshold value temporarily stored at step S03 is slightly changed (that is, a change below a predetermined value) and the operation threshold value after the change is set (step S12) so that the operation assistance control is slightly more easily executed by slightly relaxing the execution conditions (that is, in order to issue the warnings only for the inattentive driving). Further, when the operation threshold value is exceeded, the control unit 5 executes the slightly easier to execute drive assistance control to end the series of processes. Meanwhile, when the signal type at the present time is the switched yellow signal or the switched red signal, the process proceeds to the following step S07.

At step S07, the operation threshold value temporarily stored at step S03 is greatly changed (that is, a change of a predetermined value or more) and the operation threshold value after the change is set so that the drive assistance control is easily executed by greatly relaxing the execution conditions. Further, when the operation threshold value is exceeded, the control unit 5 very easily executes the drive assistance control to end the series of processes.

Next, the operation effect of the exemplary embodiment of the present invention will be described. According to the exemplary embodiment of the present invention, the execution conditions for executing the drive assistance control that assists the driving of the subject vehicle C are changed and set by the setting unit 4, based on the signal device information acquired by the acquisition unit 2. As such, since the execution conditions are set based on the signal device information, even when the speed of the preceding vehicle P is changed due to the influence of the switching of the signal device S around the intersection where the signal device S is installed but the driver is not aware of the change in the speed of the preceding vehicle P due to the inattentiveness, oversight of the signal device, or the like, it is possible to cope with the change by executing the drive assistance control at a proper timing (that is, an early timing which the driver does not feel is troublesome). As a result, it is possible to assist the safer driving of the vehicle.

Further, since the setting unit 4 changes and sets the execution conditions based on the switching information included in the signal device information, it is possible to cope with the switching to the yellow signal and the red signal in the signal device S by appropriately executing the necessary drive assistance control. As a result, it is possible to assist the safer driving of the vehicle.

Further, when the inattentiveness of the driver is detected, since the setting unit 4 changes and sets the execution conditions, it is possible to cope with the timing of the inattentiveness of the driver by appropriately executing the necessary drive assistance control. As a result, it is possible to assist the safer driving of the vehicle.

Further, since operation threshold values corresponding to the setting of the execution conditions are changed based on the signal device information acquired by the acquisition unit 2, it is possible to more finely and appropriately cope with the necessary drive assistance control by slightly changing the operation threshold values. As a result, it is possible to assist the safer driving of the vehicle.

As described above, although the exemplary embodiments of the present invention were described, the present invention is not limited to the exemplary embodiments. For example, in the exemplary embodiment of the present invention, although the functions of the setting unit 4 and the control unit 5 are implemented by the ECU, the functions (or, a portion of these functions) of the position detection unit 1, the acquisition unit 2, the inattentiveness detection unit 3, the setting unit 4, and the control unit 5 may be implemented by the ECU.

INDUSTRIAL APPLICABILITY

As set forth above, the exemplary embodiments of the present invention can provide the drive assistance apparatus capable of assisting the safer driving of the vehicle.

The invention claimed is:

1. A drive assistance apparatus configured to execute a drive assistance control to assist driving a subject vehicle, the drive assistance apparatus comprising:
    a sensor configured to detect a positional relationship between obstacles present in front of the subject vehicle and the subject vehicle itself;
    a communication device configured to acquire signal device information regarding signal devices on a traveling path of the subject vehicle; and
    a controller configured to set a threshold value for determining whether to execute the drive assistance control based on the signal device information and to execute the drive assistance control in response to the threshold value being exceeded,
    wherein:
        the signal device information includes switching information regarding a switching of a signal type; and
        the controller is configured to change the threshold value based on the switching information.

2. The drive assistance apparatus of claim 1, further comprising an inattentiveness detection unit configured to detect an inattentiveness of a driver driving the subject vehicle,
    wherein the controller is configured to set the threshold value when the inattentiveness detection unit detects the inattentiveness of the driver.

3. The drive assistance apparatus of claim 1, wherein the sensor is a millimeter-wave radar.

4. The drive assistance apparatus of claim 1, wherein the sensor is an image sensor.

5. The drive assistance apparatus of claim 2, wherein the inattentiveness detection unit is a monitoring camera configured to image and analyze the face of the driver.

6. The drive assistance apparatus of claim 1, wherein the threshold value is a numerical value based on road conditions near the subject vehicle.

7. The drive assistance apparatus of claim 6, wherein road conditions include the proximity of a preceding vehicle.

* * * * *